United States Patent [19]

Hawkins

[11] 4,171,163

[45] Oct. 16, 1979

[54] MOULDING OF PLASTICS

[75] Inventor: Wallace G. Hawkins, Bridgewater, England

[73] Assignee: C. & J. Clark Ltd., Somerset, England

[21] Appl. No.: 831,346

[22] Filed: Sep. 7, 1977

[30] Foreign Application Priority Data

Sep. 7, 1976 [GB] United Kingdom .............. 37084/76

[51] Int. Cl.$^2$ ........................ B01F 15/04; B01F 15/06
[52] U.S. Cl. .................................... 366/145; 366/146; 366/159; 366/160
[58] Field of Search .............. 366/159, 131, 136, 137, 366/144, 145, 154, 160

[56] References Cited

U.S. PATENT DOCUMENTS

| | | | |
|---|---|---|---|
| 3,026,183 | 3/1962 | Cole | 366/145 X |
| 3,051,455 | 8/1962 | Magester | 366/159 X |
| 3,092,469 | 6/1963 | Jaffe et al. | 366/159 X |
| 3,128,995 | 4/1964 | Shaeffer | 366/159 X |
| 3,180,350 | 4/1965 | Rill, Jr. et al. | 366/145 X |
| 3,424,439 | 1/1969 | Baker | 366/159 X |
| 3,905,582 | 9/1975 | Fiorentini | 366/159 |
| 3,964,731 | 6/1976 | Ernst | 366/159 X |
| 4,070,008 | 1/1978 | Schlieckmann | 366/159 |

Primary Examiner—Stanley N. Gilreath
Attorney, Agent, or Firm—Wenderoth, Lind & Ponack

[57] ABSTRACT

The invention relates to apparatus for use in the production of mouldings of a plastics material which initially consist of at least two liquid components which have to be intimately mixed before introduction into a mould. Such an apparatus comprises a mixing head, and for each component to be mixed, a reservoir tank, a pump for supplying the component from the reservoir tank to the mixing head, and a valve at the mixing head operable to direct the component either into the mixing head or back to the tank. To keep the lengths of connecting pipes short, the reservoir tanks, the pumps, and the valves are arranged as a compact unit in close proximity to the mixing head, and in a preferred arrangement, the mixing head, the pumps, the valves and the tanks are mounted in or on a metal block which is formed with ducts through which the components flow.

The metal block, and if necessary the reservoir tanks and the pumps, may be provided with electric heating elements and thermostats to ensure the components are each maintained at the required operating temperature, and by running the pumps for a time before a mixing operation uniformity of temperature of each component throughout the system is ensured.

5 Claims, 5 Drawing Figures

4,171,163

MOULDING OF PLASTICS

BACKGROUND OF THE INVENTION

This invention relates to apparatus for use in the production of mouldings of a plastics material, such as polyurethane, which initially consists of at least two liquid components which have to be intimately mixed before introduction into a mould.

The proportions of the components in the mix must be carefully controlled and maintained constant if consistent results are to be obtained and this is made difficult since the viscosity of the components is dependent on temperature. If there is a temperature variation of any of the components the resulting changes in viscosity may not only upset the accuracy of metering of the components but can also produce pressure variations which may cause surging in the flow of the components to a mixing head and which in turn leads to a lack of coincidence at the beginning and end of each shot, thus producing incorrectly mixed material.

The maintenance of a sufficiently accurate temperature control involves the use of elaborate and expensive equipment and even so it is found that when using known apparatus temperature variations occur which make it impossible to produce moulded products of a consistently reliable and acceptable standard quality.

It will be understood that plastics materials of the kind used in the apparatus of this invention differ as regards the required working temperature. For example, one such material requires the components to be maintained at a temperature within the range 40°–50° C. whereas another material requires the components to be maintained at about ambient temperature. Accordingly, the maintenance of the components at constant temperature involves, in the first case, the supply of heat and, in the second case, probably the removal of heat.

SUMMARY OF THE INVENTION

It is an object of the present invention to provide an improved apparatus which avoids the difficulties of maintaining constant temperature which are inherent in apparatus as known and used at the present time.

According to the present invention the improved apparatus comprises a mixing head, and for each component to be mixed, a reservoir tank, a pump acting during operation of the apparatus for supplying the component to the mixing head, a valve at the mixing head operable to direct the component either into the mixing head or back to the tank, and means for effecting simultaneous operation of all the valves.

Preferably the capacity of each reservoir tank is quite small, e.g. one gallon, and means may be provided whereby this tank is topped as required from a supply tank of larger capacity.

To ensure accurate temperature control of each of the components the reservoir tanks, the pumps, and the valves may all be arranged as a compact unit in close proximity to the mixing head so that the length of any necessary connecting pipes is kept to a minimum. Suitably disposed heating or cooling arrangements, thermostats and insulating lagging are provided to ensure that the whole unit is maintained at a constant temperature, so that the several components are also maintained each at the desired temperature.

The recirculation of the components which is effected by the pumps, except during the mixing process, ensures that these results are obtained. While the pumps may be operated continuously during times when the apparatus is ready for use, this is not absolutely essential, provided that they are operated for a period before a mix which is sufficient to ensure equalization of the temperature of each component throughout the system.

In a preferred arrangement of the apparatus of this invention, the mixing head, the reservoir tanks, the pumps and the valves are mounted in or on a metal block, and in good thermal contact therewith, while the feed passages for the plastics components are formed as ducts within the block. Such an arrangement has the further advantage that the use of short feed passages contained entirely within the metal structure greatly reduces the pressure variations or surges which sometimes occur when separate external flexible pipes are used.

When the components have to be maintained at elevated temperature, while the supply tanks may themselves have to be heated as well as the pipes connecting them to the reservoir tanks, only a crude temperature control is required since the amount supplied to the reservoir tank during a topping operation will be quite small and such differences in temperature as exist will be quickly dissipated without affecting the temperature of the bulk of the contents of the reservoir tank.

BRIEF DESCRIPTION OF THE DRAWINGS

The invention will now be described by reference to the accompanying drawings which illustrate an apparatus for use in producing polyurethane mouldings from a mix of two components that have to be maintained at elevated temperature, and in which.

DETAILED DESCRIPTION OF THE INVENTION

Figure 1:
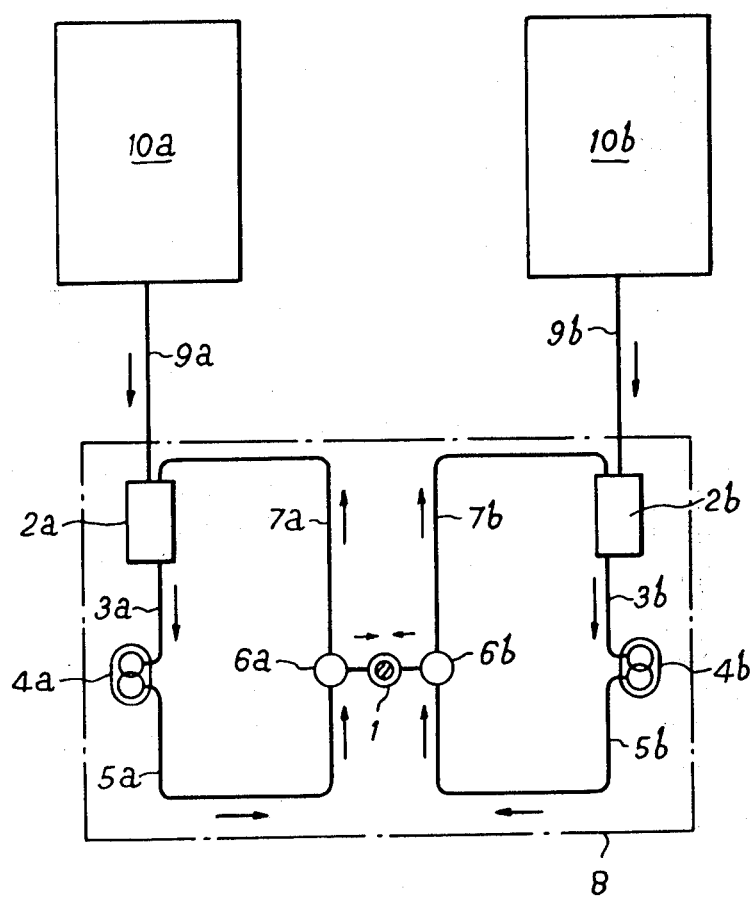
FIG. 1 shows diagrammatically the essential components of the apparatus and the pipes or ducts by which they are connected.
Figure 4:
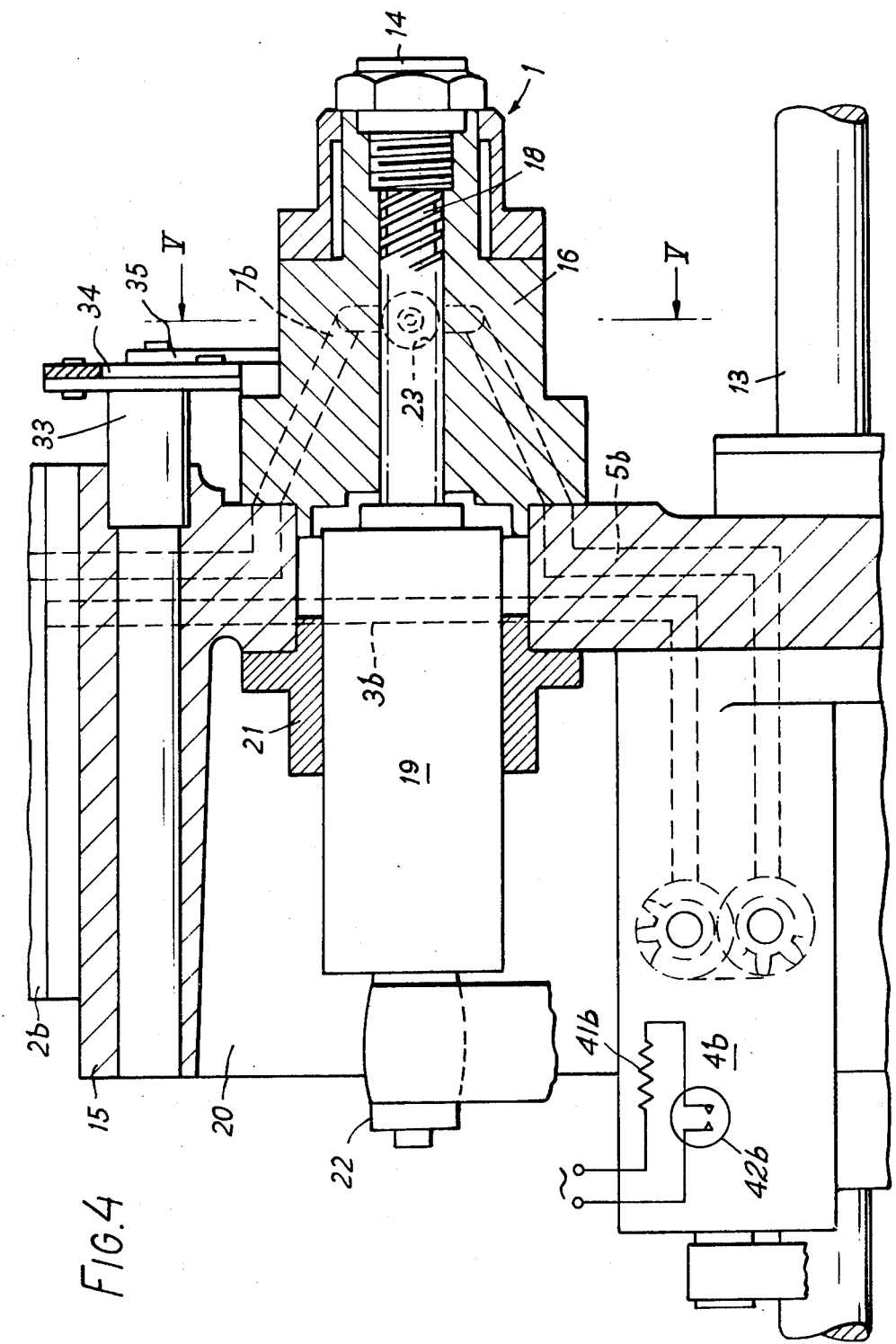
FIG. 4 is a fragmentary cross sectional view taken on the line IV—IV in FIG. 3.

Referring first to FIG. 1 the apparatus includes a mixing head 1, which basically comprises a screw and is shown more clearly in FIG. 4, arranged within a cylindrical bore in a housing, the screw being rotated during operation at a speed of say 15,000 r.p.m. Rotation of the screw not only operates to produce an intimate mix of the two components but also to eject the mixture from the end of the housing which is formed as a nozzle.

The two components are contained in respective reservoir tanks 2a and 2b and are drawn therefrom through ducts 3a and 3b by pumps 4a and 4b. These pumps are conveniently gear pumps which operate also as metering devices. The pumps rotate at relative speeds which correspond to the required proportion of each component in the final mix.

The output side of the pumps is connected through ducts 5a and 5b to respective two-way valves 6a and 6b which are arranged in the housing of the mixing screw. These valves are operable in such a way that the pump outputs are delivered either to the bore of the housing for mixing and ejection by the screw during a moulding operation or back via the ducts 7a and 7b to the respective reservoir tanks 2a and 2b. The pumps are preferably kept running during use of the apparatus so that each component is continuously recirculated throughout ducts 3a, 3b, 5a, 5b and 7a, 7b except during a moulding operation.

The reservoir tanks, the pumps, the two-way valves and also the mixing head are all maintained at a suitable elevated temperature by the provision of electric heating elements and insulating lagging (not shown) to form a constant temperature environment represented by the dotted rectangle 8. Thermostats (not shown) are provided to ensure that the temperature is maintained constant.

The reservoir tanks 2a and 2b are kept topped through pipes 9a and 9b from supply tanks 10a and 10b which may be arranged at a distance and may supply more than one apparatus, the supply being effected by gravity. Alternatively the supply may be effected by pressurising the supply tanks or by using pumps, and the topping-up operation may be controlled if necessary by using level sensors in the reservoir tanks.

It will be appreciated that the supply tanks and the connecting pipe work may have to be heated, but only a crude temperature control is necessary since the amount delivered to a reservoir tank during a topping operation will be quite small and will have no substantial effect on the temperature of the contents of the reservoir tank.

Referring now to FIGS. 2 to 5 which illustrates a form of an apparatus according to this invention designed for use in an injection moulding system, the main assembly 11 of the apparatus is mounted in a housing 12 on slides 13 so that it can be moved to retract the nozzle 14 of the mixing head 1 from a mould (not shown).

This main assembly 11 of the apparatus comprises a metal block 15, conveniently consisting in the main of an aluminium casting, on which are mounted the reservoir tanks 2a and 2b, the pumps 4a and 4b, and the mixing head 1.

This form of construction leads to a compact arrangement in which all the parts are in good thermal contact with the block 15 and consequently are at the same temperature. The block is heated by electric heaters 36a and 36b (FIG. 5) contained in 37a and 37b bores therein and thermostats 38a and 38b are provided to maintain the temperature constant. The reservoir tanks 2a and 2b may additionally have electric heaters arranged round their circumference and covered by a suitable insulating lagging.

Figure 2:
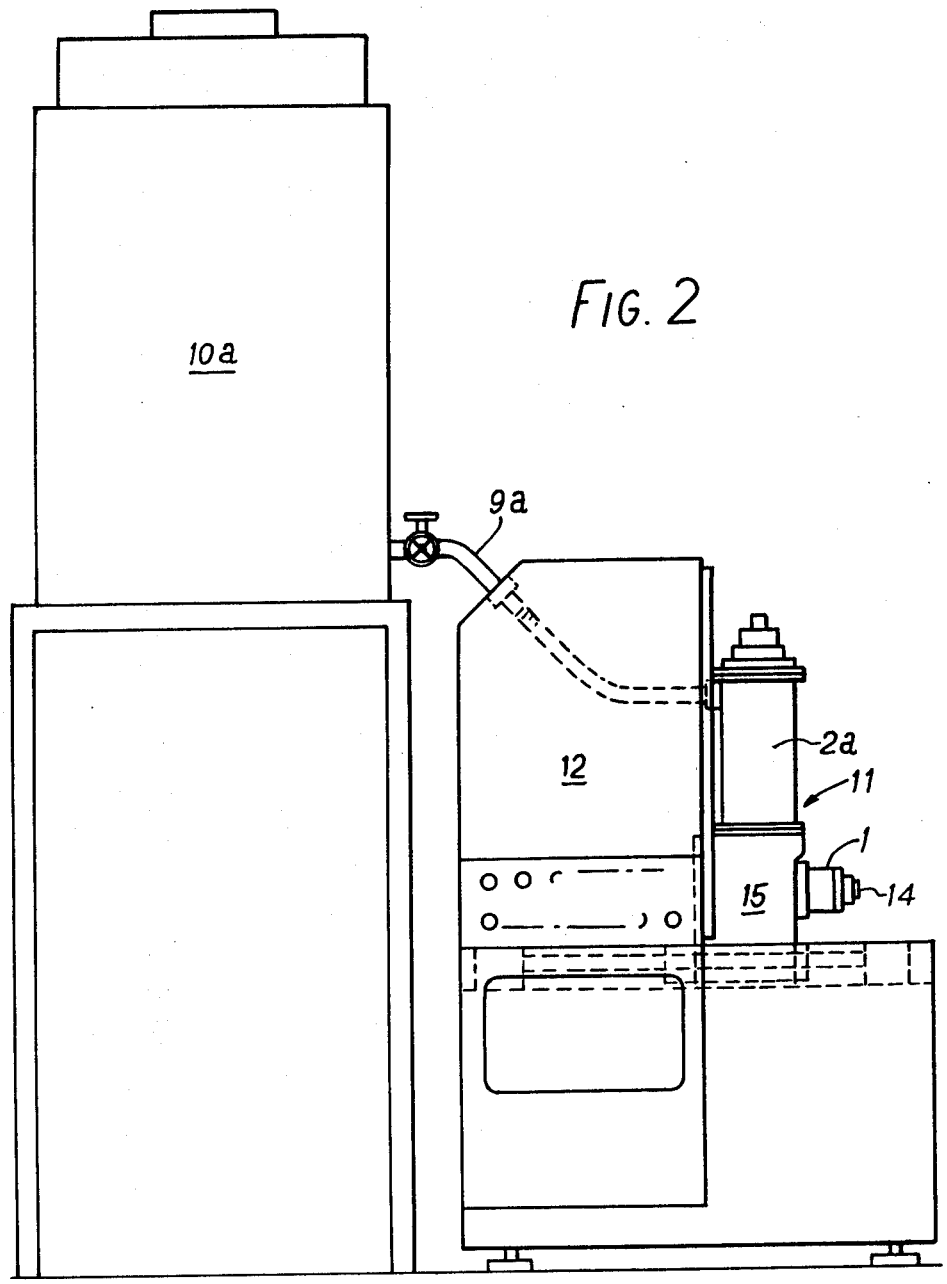
FIGS. 2 and 3 are respectively a side elevation and a plan view of the apparatus.

In FIG. 2 the supply tank 10a is shown in an elevated position and, for convenience in illustration, adjacent the housing 12, this tank being connected with the reservoir tank 2a by pipe 9a. In practice the supply tanks may be arranged remote from the housing 12, and may supply liquid components to more than one mixing apparatus.

Figure 3:
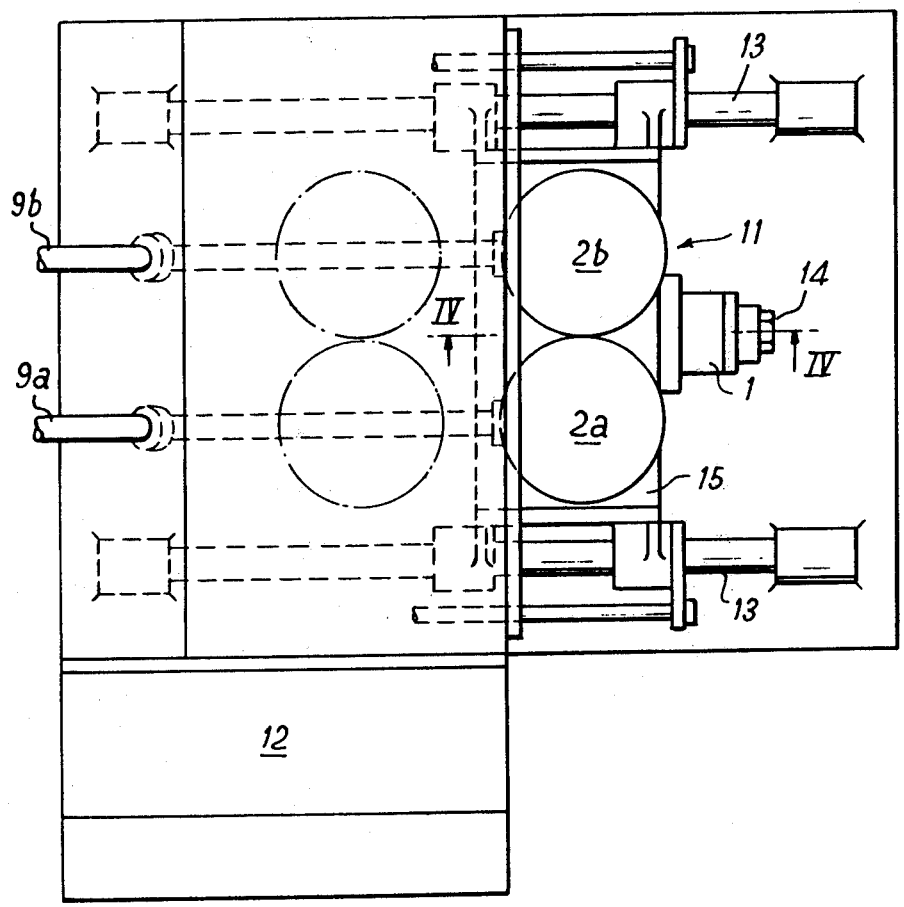
Figure 5:
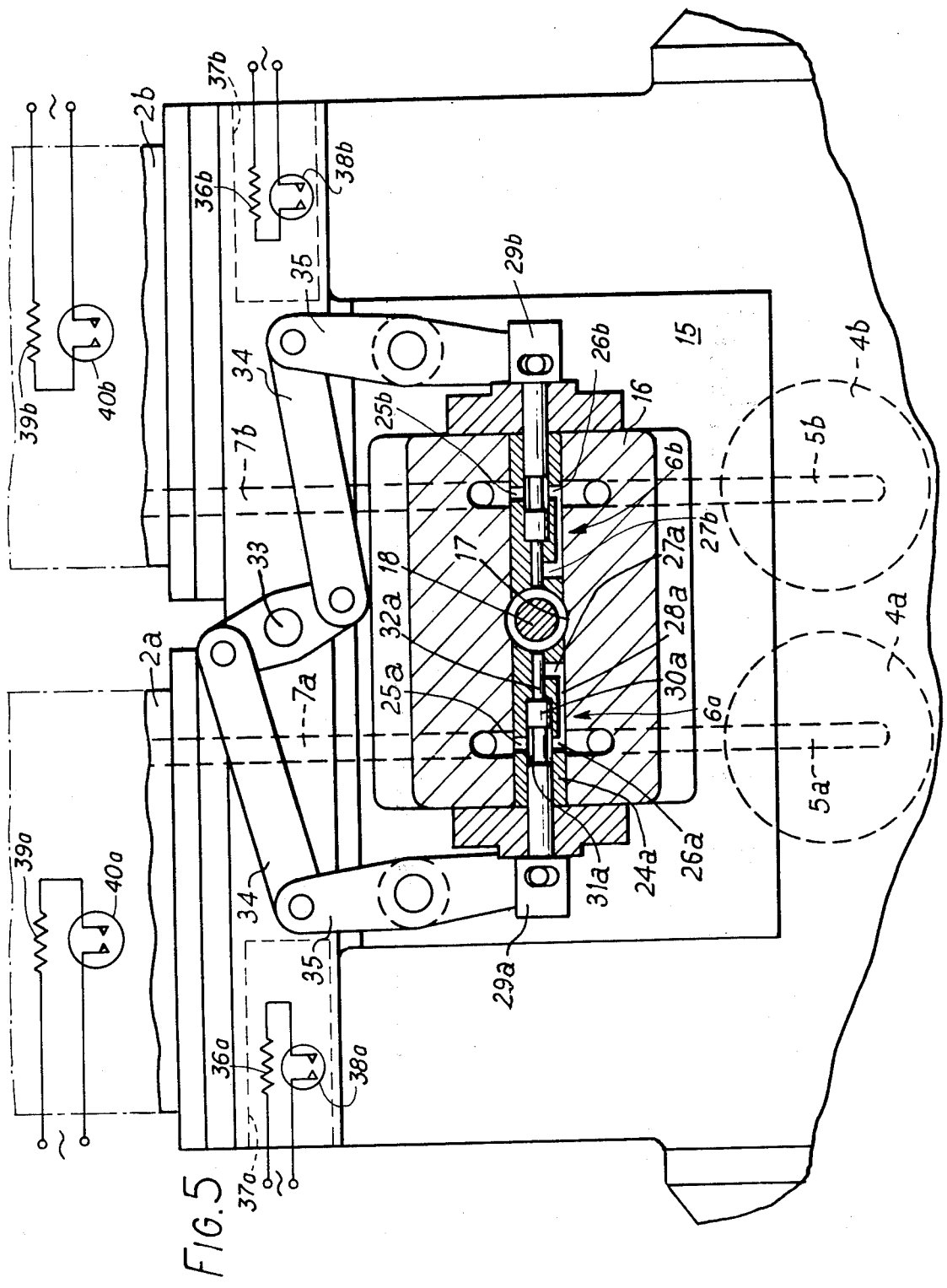
FIG. 5 is a sectional elevation taken on the line V—V in FIG. 4.

FIGS. 4 and 5 show on a larger scale and in greater detail the parts of the main assembly 11 of FIGS. 2 and 3.

Secured to the block 15 and positioned in a recess on its front face is the housing 16 of the mixing head 1. This housing has a through bore 17 accommodating a mixing screw 18 which is connected to a driving spindle 19. This spindle extends through an aperture in the block 15 into a deeper recess 20 formed in the rear face of the block. The spindle is supported in a suitable bearing 21 mounted on the block and at its rear end has drive means 22 for connection with an electric motor (not shown).

The recess 20 in the block 15 also accommodates two gear pumps 4a and 4b which are secured to the block and each is connected by suitable driving means (not shown) so that the pumps can be driven at relative speeds appropriate to the desired proportions of the two components in the mix.

The housing 16 of the mixing head has a transverse bore 23 in which are accommodated the components of the two way valves 6a and 6b. These components, which are identical for each valve and will be described with reference to valve 6a, comprise a barrel 24a fixed in the bore 23 and having a bore the diameter of which changes at a point along its length. The barrel is formed with ports 25a and 26a in its larger diameter bore and with a port 27a in its smaller diameter bore, the ports 26a and 27a being connected by a groove 28a in the exterior of the barrel. A plunger 29a has a larger diameter portion 30a formed with an annular groove 31a and a smaller diameter portion 32a slidable respectively in the larger and smaller diameter portions of the bore in the barrel 24a. The plungers 29a, 29b are movable together from the illustrated position to a position in which they are retracted from the mixing screw 18 by the rotation of a spindle 33 acting through links 34 and pivoted levers 35.

In the illustrated position of the plungers 29a it will be seen that the groove 31a lies opposite the ports 25a and 26a which are thus in communication, whereas the smaller diameter portion 32a of the plunger seals the port 27a. In the retracted position of the plunger, the larger diameter portion 30a thereof seals the ports 25a and 26a from one another whereas the port 27a is opened to permit communication between the port 26a and the bore 17 in the housing 16.

The various ducts leading from the valves 6a and 6b, which are shown diagrammatically in FIG. 1, are formed as bores in the components of the assembly 11 and there are no external pipes at all. These ducts are indicated by dotted lines in FIGS. 4 and 5, and as can be seen the duct 3a extends from the bottom of the reservoir tank 2a through the block 15 to the pump 4a, the duct 5a extends from this pump through the block 15 and the mixing screw housing 16 to the port 26a of the valve 6a, while the duct 7a extends from the port 25a through the housing 16 and the block 15 to the upper part of the reservoir tank 2a. A similar arrangement of ducts exists for the reservoir tank 2b and its associated components.

In the operation of the apparatus of this invention, the apparatus may be maintained in a stand-by condition with the pumps 4a and 4b running and the valves 6a and 6b in the position illustrated in FIG. 5. Under such conditions the liquid components drawn from the reservoir tanks 2a and 2b by the action of the pumps will be delivered back to these tanks since the ports 25a, 25b and 26a, 26b are in communication. When it is desired to deliver the mixed components to the nozzle 14 the spindle 33 is turned to move the valve plungers 29a, 29b to their retracted position when the recirculation of the components is stopped by closing the connection between ports 25a, 25b and 26a, 26b and instead the components are delivered to the bore 17 of the mixing head through the port 27a, 27b, the mixing screw 18 being of course in rotation at this time.

The continuous recirculation of the components during stand-by ensures that their temperatures remain constant and the fact that all the components of the assembly are in good thermal contact with the block 15 and form a compact assembly contribute to this desirable result. If, for correct operation of the mix, the components have to be maintained at an elevated temperature, the block, as previously mentioned, may include electric heaters and suitable thermostats.

In some cases it is desirable to maintain the individual components at constant but somewhat different temperatures. For example in the case of a typical polyurethane mix it may be convenient to maintain the components at different temperature one at about 40° C. and the other at about 50° C. In that case, the two reservoir tanks 2a, 2b and associated pumps 4a, 4b may each have an electric heater 39a, 39b and a suitable thermostat 40a, 40b. The pumps 4a, 4b may each have an electric heater 41b and adjustable thermostat 42b (FIG. 4), and electric heaters 36a, 36b in the block 15 may be arranged and controlled by thermostats 38a, 38b to set up a temperature gradient across the block so that each side has a temperature appropriate to that required for the component circulating through that side of the block. Here, again, the recirculation of the components which is effected by the pumps, except during a mixing operation, will maintain the temperature of the components constant at a value determined by the temperature controllers.

If, on the other hand, the components have to be maintained at room temperature or below the block temperature, then possibly the reservoir tanks and pumps may be provided with passageways for the circulation of a cooling fluid. When two components are used and they have to be at different temperatures, the block may be formed at each side with a separate set of passageways, and in each passageway a different temperature cooling fluid is circulated. It will be appreciated that in this form of the apparatus means are provided which maintain the cooling fluid or fluids at the desired temperature.

In most cases the actual temperature of the components is not very critical. It is, however, essential that each component shall be substantially at the same temperature throughout the system and that this temperature is kept constant. This is what the apparatus of this invention is designed to achieve.

In the improved apparatus of this invention it has been found that if a small quantity of a special lubricating agent, such as the product No. 2511 supplied by the Avalon Chemical Co., is supplied to the bore of the mixing screw housing after each operation, but while the screw is still rotating, the build up of a polyurethane film on the screw will be considerably retarded with the advantageous result that it is necessary to remove the screw for cleaning much less frequently.

The improved apparatus of this invention may be used in different ways in the production of mouldings. Thus, it may be used to pour the mixed components into an open mould in a process usually known as casting, or it may be used in conventional injection moulding operations.

In the latter case it has been found that the apparatus of this invention may be used in a way which enables the construction of the moulds to be simplified. In conventional arrangements after injection, the injection nozzle is removed from the mould and some sort of valve or gate on the mould is operated to close the inlet to the mould to prevent escape of the charge when the pressure rises within the mould during a stage when the charge foams. It has been found that such values or gates may be dispensed with if, after injection has been completed, the injection nozzle is maintained in sealing contact with the mould during the foaming stage and with the mixing screw rotating.

I claim:

1. In an apparatus for use in the production of molded plastic which requires that at least two components, which are liquid at their operating temperature, be intimately mixed before being introduced into the mold, said apparatus including: a mixing head having a body with a bore therethrough; a mixing screw rotatably mounted in said bore; and for each component to be mixed, a reservoir tank connected to said mixing head, a pump means between said reservoir tank and said mixing head for pumping a liquid component from said reservoir tank to said mixing head, valve means for selectively directing the flow of liquid to said mixing head from said reservoir tank and back to said reservoir tank from said mixing head, and control means connected to said valve means for simultaneously operating said valve means, an improvement comprising:

an improved mixing head having a body with said valve means being formed within said body;

a metal block having said improved mixing head, said reservoir tanks and said pump means connected thereto in good thermal contact therewith;

said improved mixing head body and said metal block having ducts formed therethrough which convey said liquid components between said mixing head and said reservoir tank through said pump means and valve means; and at least one thermostatically controlled electric heating element in each reservoir tank for maintaining the liquid component in each reservoir tank at a constant temperature.

2. An improvement as claimed in claim 1, wherein said reservoir tanks are of limited capacity; and further comprising remote liquid supply tank means connected to said reservoir tanks for maintaining supplies of said liquid components in said reservoir tanks.

3. An improvement as claimed in claim 1, further comprising at least one thermostatically controlled electric heating element in said metal block for maintaining said metal block at a constant temperature.

4. An improvement as claimed in claim 1, further comprising at least two sets of thermostatically controlled electric heating elements, each set in a different location within said metal block for maintaining different temperature zones within said block.

5. An improvement as claimed in claim 4, further comprising a thermostatically controlled electric heating element connected to each pump means.

* * * * *